(12) United States Patent
Wang et al.

(10) Patent No.: US 6,300,431 B1
(45) Date of Patent: Oct. 9, 2001

(54) PHASE TRANSFER PROCESS WITH CATALYST RECOVERY

(75) Inventors: Hsien-Chang Wang, Bellaire; Chia Shian Chee, Houston, both of TX (US); W. S. Winston Ho, Annandale, NJ (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 09/466,520

(22) Filed: Dec. 17, 1999

(51) Int. Cl.$^7$ ........................................................ C08F 2/08
(52) U.S. Cl. ........................ 526/69; 526/89; 526/348.2; 526/217; 526/348.6; 526/346; 526/347.1; 526/236
(58) Field of Search ............................ 526/69, 89, 348.2, 526/217, 348.6, 346, 347.1, 236

(56) References Cited

U.S. PATENT DOCUMENTS

| | | | |
|---|---|---|---|
| 4,754,089 | * 6/1988 | Matson et al. | 570/260 |
| 5,162,445 | * 11/1992 | Powers et al. | 525/333.4 |
| 5,548,023 | * 8/1996 | Powers et al. | 525/69 |
| 5,548,029 | * 8/1996 | Powers et al. | 525/195 |
| 5,654,379 | * 8/1997 | Powers et al. | 525/356 |
| 5,959,049 | * 9/1999 | Powers et al. | 526/185 |
| 6,156,810 | * 12/2000 | Chee et al. | 521/32 |

* cited by examiner

Primary Examiner—David W. Wu
Assistant Examiner—William K Cheung
(74) Attorney, Agent, or Firm—Joseph F. Reidy; Kevin M. Faulkner; Douglass W. Miller

(57) ABSTRACT

A process for catalytic recovery in a phase transfer process wherein heterogeneous reactions in a liquid-liquid two phase reaction systems using a phase transfer catalyst is improved by separating the two liquid phases with a membrane which retains the catalyst while passing the aqueous polar liquid thereby allowing easy recovery of the phase transfer catalyst. The reaction is carried out between reactants selectively soluble in the different phases, one of the reactants being transferred into the other phase by means of a phase transfer catalyst which is soluble in said polar liquid phase with the one reactant. The phases are separated after completion of the reactions by adding water to the two-phase reaction system to dissolve out the polar liquid phase containing the phase transfer catalyst into an aqueous phase. Further, the phase transfer catalyst is separated from the polar liquid phase by passing the aqueous polar liquid phase through a membrane that retains the transfer catalyst while passing the polar liquid.

11 Claims, No Drawings

PHASE TRANSFER PROCESS WITH CATALYST RECOVERY

FIELD OF THE INVENTION

The present invention relates to phase transfer processes for conducting heterogeneous reactions in a liquid-liquid two-phase reaction system between reactants which are soluble in different ones of the two phases, using a phase transfer catalyst to complex with and transfer one of the reactants for reaction in the phase in which it is insoluble. More precisely this invention relates to the recovery and reuse of the phase transfer catalyst from the process waste stream for economic and environmental purposes.

BACKGROUND OF THE INVENTION

U.S. Pat. No. 5,162,445, which is commonly assigned with the present application, discloses a phase transfer polymer modification process in which a polymer of an isoolefin and a para-alkyl styrene, is functionalized at a plurality of pendant sites by introducing a plurality of random electrophilic halo-benzylic sites. The copolymer is now reactive with nucleophilic reagents that displace the halogens and introduce new functional groups such as vinyl ester groups and/or phenyl ether groups. Since the polymer and the nucleophilic reagent are not soluble in a common reaction medium, the reaction requires the use of two liquid solvent phases which are at least partially miscible, and a phase transfer catalyst which is soluble in the same liquid phase as the nucleophilic reagent and forms a complex therewith which is soluble in the other liquid phase. The complex transfers into the other liquid phase where the nucleophilic reagent displaces halogen ions and replaces them with the desired pendant functionality, e.g., ester or ether groups.

Among the problems encountered with phase transfer processes is the high cost of phase transfer catalysts, the environmental problems caused by the discharge of chemical-containing process waste streams, and the problems involved in attempting to recover the phase transfer catalyst from the two phase reaction medium.

U.S. Pat. No. 4,754,089 discloses a phase transfer reaction process for the production of agricultural chemicals, pharmaceuticals and other specialty chemicals. The patent discloses an aqueous phase containing a first reactant and a phase transfer catalyst capable of complexing therewith isolated by means of a membrane present within the reactor from an immiscible organic liquid phase containing a second reactant which is soluble therein. The reactant-catalyst complex is capable of passing into or through the membrane to the organic liquid phase where the reactants react to release the phase transfer catalyst which returns to the first phase to complex with more of the first reactant and transfer it into or through the membrane to repeat the reaction cycle until either or both of the reactants are used up. Such membrane reactors are expensive and the reaction rate is reduced by the separation of the phases. However, such liquid phase separation does enable the recovery of the expensive phase transfer catalyst, after the reaction is completed, since the catalyst is isolated within the phase in which it is soluble, such as water.

It is desirable to be able to recover the expensive phase transfer catalyst from a conventional two phase integrated liquid-liquid reaction system, which does not require the use of a membrane reactor, and in which one of the liquids must be a non-polar liquid, such as a cycloalkane, in order to function as a good solvent for both the starting second reactant, such as a hydrocarbon-paramethyl styrene copolymer, and for the reaction product, as the copolymer is provided with additional pendant functional groups during the reaction. In such a system the other liquid cannot be pure water since water is completely immiscible with non-polar liquids, such as cycloalkanes, no phase integration occurs, and the reaction rate is very slow and unsatisfactory.

In conventional two phase integrated liquid-liquid reaction systems using polar and non-polar liquids which have the necessary degree of miscibility, the phase transfer catalyst remaining, after the reaction is completed, is contained within the waste effluent comprising miscible amounts of the polar and non-polar liquids and is lost.

SUMMARY OF THE INVENTION

The present invention relates to a novel process for the recovery of phase transfer catalyst after completion of the reaction from a liquid-liquid, two-phase reaction system. The phase transfer catalyst can then be re-used in another similar reaction system. The invention allows for the removal of chemical waste from the process waste stream, for ecological purposes without loss of the catalyst. This is enabled by the use of a water-soluble polar solvent as the first phase liquid and the use of a non-polar solvent, which is at least partially miscible with the first phase liquid, as the second phase liquid. The phase transfer catalyst and nucleophilic reactant are selectively soluble in the polar phase, and the electrophilic reactant and reaction product are selectively soluble in the non-polar solvent.

When the reaction is completed, the two-phase liquid reaction medium is washed with water to dissolve out the polar liquid and the phase transfer catalyst. The catalyst, along with chemicals such as salts and alkaline reagents, is separated from the aqueous polar solvent by means of a suitable membrane which recovers the catalyst phase, as the retentate, while allowing passage of the aqueous phase as the permeate.

DETAILED DESCRIPTION OF THE INVENTION

The present invention is based upon the discovery that water-soluble phase transfer catalysts can be recovered or reclaimed from liquid-liquid two phase reaction systems, after completion of the reaction, through the use of polar and non-polar liquids for the two phases, respectively, which liquids are at least partially miscible with each other, the polar liquid being water-soluble and the non-polar liquid being water-insoluble.

In such a system, the final two-phase reaction mixture can be washed with water to dissolve the polar solvent and the soluble phase transfer catalyst into the aqueous phase which is incompatible or immiscible with the non-polar phase containing the formed reaction product. The phases are separated, and the phase transfer catalyst is removed from the aqueous polar solvent waste stream by use of a commercially-available membrane, preferably such as a polyamide membrane, which retains the phase transfer catalyst, and any other chemicals such as alkaline agents and salts, while allowing passage of the aqueous polar liquid waste stream. The recovered phase transfer catalyst can be recycled back into a similar phase transfer system thereby reducing the overall cost of the catalyst required for such system.

A preferred phase transfer process that can be adapted in accordance with the present invention is one disclosed in commonly-assigned U.S. Pat. No. 5,162,445, incorporated fully herein by reference, for US patent practices only, for the preparation of functionalized hydrocarbon para-alkylstyrene copolymers to which reactive pendent radicals, such as vinyl ester and/or ether groups, are attached during the phase transfer process. Phase transfer is necessary in cases where the nucleophilic reactant is not soluble in the non-polar solvent for the copolymer, and requires its own polar solvent which must be at least partially miscible with the nonpolar solvent to form a liquid-liquid two phase system. The phase transfer catalyst is soluble in the polar solvent and complexes with the nucleophilic reactant to form a complex that is soluble in the non-polar phase to transfer the nucleophilic reactant into the non-polar phase for ion-exchange with the electrophilic sites on the copolymer. The separated phase transfer catalyst is dissolved back into the polar phase and complexes with additional nucleophilic reactant, to repeat the phase transfer reaction cycle.

Suitable polar liquids for use in the phase transfer process are liquids which are at least partially soluble in or miscible with the non-polar liquid solvent for the reaction product, such as a soluble functionalized co-polymer, and are water-soluble solvents for the phase transfer catalyst and for the nucleophilic reactant. Preferred polar solvents should be less acidic than the reactants. Useful polar solvents include aliphatic alcohols having up to about six carbon atoms, such as isopropanol, aliphatic ketones such as diethyl ketone, and aliphatic ethers such as methyl ether.

Suitable non-polar liquids are hydrocarbons which are water-insoluble, at least partially miscible with the polar liquid and are good solvents for the second reactant and for the formed reaction product. Preferred non-polar liquids are cycloaliphatic compounds, such as cyclohexane, hydrocarbons having from 4 to 7 carbon atoms, such as pentane, and halogenated hydrocarbons having 1 to 7 carbon atoms, such as ethylene chloride.

The selection of a particular polar solvent(s) and a particular non-polar solvent(s) will be dependent upon the solubility properties of the reactants, the reaction product and the phase transfer catalyst used. The polar solvent cannot consist of pure water since water is not at least partially miscible with the non-polar solvent. Additionally, the polar solvent does not need to contain water. However, the polar solvent may contain minor amounts of water (i.e.: aqueous), which is miscible with the main polar solvent, such as isopropanol, provided that the polar mixture is at least partially compatible or miscible with the non-polar solvent.

In the present phase transfer reactions, one reactant is a nucleophilic reagent, capable of forming a complex with the phase transfer catalyst, both added to the polar solvent. The second reactant, soluble in the non-polar solvent, is an electrophilic reagent such as a functionalized soluble polymer having a plurality of electrophilic pendent sites such as benzylic halide sites capable of nucleophilic substitution reactions with the first reactant.

The nucleophilic reagents which are capable of donating electrons to benzyl halides and to participate in the "clean" nucleophilic substitution displacement reaction by means of which the halide ion is displaced and replaced by a functional group Y may be either Y or YM; wherein M is hydrogen, a metal ion or an onium ion and Y is either a simple nucleophile containing oxygen, sulfur, nitrogen, phosphorus, carbon, silicon, or various metals; or Y is a small molecule of <1000 molecular weight which may contain other functionality (which is unreactive or blocked under the conditions of the nucleophilic displacement reaction) in addition to the simple nucleophile which becomes attached at the benzylic position vacated by halogen in the nucleophilic displacement reaction.

A wide variety of nucleophilic reagents which are soluble in polar organic solvents, such as aliphatic alcohols, are known to those skilled in the art, and the selection of such reactants will be apparent, depending upon the identity of the desired reaction product. The variety of nucleophiles and the nucleophilic reaction are disclosed in U.S. Pat. No. 5,162,455 which disclosure is incorporated in its entirety by reference, for US patent practices only. For example, according to the preferred embodiment of the present invention in which hydrocarbon polymers are reacted to attach pendant functional radicals, such as vinyl ester, ether or other radicals to the electrophilic sites, it is apparent that the nucleophilic reactant used must contain the desired vinyl ester, ether or other group for substitution onto the polymer sites. Suitable reactants include acrylic acid, methacrylic acid, 4-hydroxy benzophenone and similar water-soluble compounds having the desired reactive groups. Suitable nucleophilic reactants for other reaction products include polar water-soluble compounds such as sodium sulfate, potassium cyanide, nitrilotriacetic acid, etc.

Any of the well known membranes which will allow passage of an aqueous liquid phase are useful in the present invention. Preferred membranes are the polyamide membranes.

The selection of the water-soluble phase transfer catalyst will depend upon the identity of the nucleophilic reactant with which it must complex. For instance, to obtain cross-linkable polymers, it is well known to one skilled in the art that one needs an ion comprising conjugated double bonds to pair up with the catalyst to form a transfer agent.

The phase transfer catalyst of the present invention preferably comprises a salt compound, more preferably a Group 15 salt compound, and most preferably a quaternary ammonium salt compound. Examples of phase transfer catalysts useful in two phase reactions include (but are not limited to): tetrabutyl ammonium bromide, tetrabutyl ammonium bisulfate, tetrabutyl ammonium hydroxide, benzyl triethyl ammonium chloride, tetrabutyl phosphonium bromide, etc.

The molar ratio of the phase transfer catalyst to nucleophile will preferably be in the range from about 0.1 to about 1, more preferably from about 0.2 to about 0.8, and most preferably from about 0.3 to about 0.5.

Also it is desirable to provide an alkaline reaction medium, for the reactants to supply a base source for the nucleophilic reaction. Therefore a measured amount of a suitable base (as measured in an aqueous system capable of maintaining a pH of approximately 9 to 12), such as potassium carbonate powder, is added to the system, with heating and stirring.

Reaction temperatures will range from ambient to below the boiling point of the non-polar liquid. For example, reaction temperatures preferably range from about 20° C. to about 150° C., more preferably from about 50° C. to about 100° C., and most preferably from about 75° C. to about 85° C. The temperatures are for non-flux conditions.

The following example summarizes conditions for a polymer modification reaction using fresh phase transfer catalyst, the membrane separation to recover the phase transfer catalyst, and a second polymer modification reaction using the recycled phase transfer catalyst.

Polymer Modification Reaction with Fresh Phase Transfer Catalyst

A 1200-ml resin flask reactor equipped with a water heater was assembled to dissolve a bromobenzyl functionalized copolymer, prepared according to U.S. Pat. No. 5,162,445, in cyclohexane. An air driven motor was provided to stir the reactor content. 1700 gms of UV grade cyclohexane was charged into the reactor and 300 gms polymer pieces were added into the reactor under stirring. When a homogeneous solution was formed in the reactor, the temperature of the reactor was slowly elevated to the desired operating temperature by adjusting the water heater. Two thermometers were provided to monitor the temperatures of the water heater and the reactor content.

During heating, 12.96 gms of potassium carbonate powder was slowly dispersed in the reactor under vigorous stirring. This chemical serves as the base source for the polymer nucleophilic reaction. Following this, an isopropanol (158 ml) solution containing 4.73 gms methacrylic acid, 0.05 gms 4-hydroxybenzphenone as nucleophilic reactants, and 8.06 gms tetrabutyl ammonium bromide as a phase transfer catalyst, and 10.37 gm of potassium carbonate was poured into the reactor. For this specific experiment, the molar ratio of the phase transfer catalyst to the bromo functionality of the polymer reactant was 0.5:1.0.

The reactor temperature was controlled at approximately 70° C. and the reactor content was agitated for about 4 hours before it was cooled to the ambient temperature. The polymer solution was then transferred into a 5-liter wash reactor with an air stirrer. About 2 liters of deionized water were added into the stirred polymer solution to wash away the potassium carbonate, phase transfer catalyst, and any other salts produced from the reaction. The solution was stirred for approximately 30 minutes and the reactor content was settled for about 2 hours.

As two distinct phases were separated in the reactor, the water phase was drained into a container. This phase would later be subjected to membrane treatment for catalyst recovery. The hydrocarbon phase solution was drained into a 5-gal metal container filled with isopropanol to precipitate the polymer. The recovered polymer was then dried in the vacuum oven at approximately 60° C. for 2 days. A sample of the dried polymer was analyzed with a Perkin-Elmer Fourier Transform Infrared Spectrometer (FTIR) for functionality conversion confirmation. The sample had approximately 0.75 mol % functionality.

Membrane Separation to Recover Phase Transfer Catalyst

A commercially available polyamide-polyurea membrane was used in the pervaporation step in which two pieces of the membrane, each with an effective membrane area of 45.6 $cm^2$ (3-inch diameter), were mounted in two membrane cells separately but in series in a pervaporation apparatus. The amount of the feed used was approximately 3,500 gm, and the feed contained about 0.2 wt % phase transfer catalyst, about 0.4 wt % potassium carbonate, about 9.4 wt % isopropyl alcohol, and about 90 wt % water. The feed was pumped and circulated over the two pieces of the membrane at about 400 ml/min. A vacuum was employed in the permeate side, about 7 mm Hg for both membrane cells. The pervaporation experiment was run for a total of 14 days with 13 days at room temperature and 1 day at approximately 40° C. For both temperatures, the permeate samples obtained were clear and free of particulates. Analyses of the permeate samples by IR showed no phase transfer catalyst, indicating the catalyst was retained by the membrane in the retentate phase completely. In other words, the selectivity of the aqueous phase vs. the catalyst phase for the membrane was extremely high (infinite).

At the end of the pervaporation experiment (14-day run), about 500 gm of the retentate containing the phase transfer catalyst and potassium carbonate was obtained. A sample of the retentate was evaporated in a hood at room temperature for about 47 hours to give a dry solid amount of 4.01 gm containing the catalyst and potassium carbonate. To the solid were added 3.39 gm of water and 21 gm of isopropyl alcohol. IR analysis of the resulting sample gave a catalyst concentration of about 4.3 wt %, i.e., 1.221 gm of the catalyst. This sample was added with additional 32.65 gm of isopropyl alcohol to give a final sample containing about 2 wt % catalyst, about 4.5 wt % potassium carbonate, about 5.6 wt % water, and about 87.9 wt % isopropyl alcohol. The final sample was used as the recycled phase transfer catalyst for a similar polymer modification reaction outlined below.

Polymer Modification Reaction with Recycled Phase Transfer Catalyst

Using a similar resin flask reactor as outlined previously, the catalyst phase recovered from the membrane separation step was re-introduced in another batch of the copolymer non-polar solution containing the polymer dispersed with potassium carbonate powder. Prior to adding the recovered catalyst into the reactor, some pre-determined amounts of fresh nucleophilic reagents, i.e., methacrylic acid and hydroxybenzophenone, were dissolved in the polar phase. Again, the reaction was conducted at about 70° C. for 4 hours under vigorous stirring. Upon cooling, the polymer solution was washed with water to remove the phase transfer catalyst and other water soluble by-products. A dried sample of the recovered polymer was analyzed with a Perkin-Elmer FTIR for functionality characterization.

With the fresh phase transfer catalyst, a full conversion of the bromine functionality was achieved after 4 hours of modification reaction at about 70° C. according to the FTIR analysis. The mole percent of the ester functionality introduced by the methacrylic acid was determined to be about 0.8%. Data from this run provides a direct comparison of reaction rate for the run using the recycled phase transfer catalyst.

With the recycled phase transfer catalyst, a partial conversion of the bromine functionality was attained under similar conditions as those of the fresh catalyst run. The FTIR analysis has estimated a conversion of approximately 60% for this run.

This example demonstrates a membrane process for recovering the expensive phase transfer catalyst from the polymer modification reaction. The recovered catalyst displayed reactivity to convert the bromo functionality of the polymer into a combination of ester and ether functionality. In summary, the present catalyst-recovery membrane process not only reduces the manufacturing costs of the formed reaction product but also minimizes the chemical waste generation.

It should be understood that the foregoing description is only illustrative of the invention. Various alternatives and modifications can be devised by those skilled in the art without departing from the scope of the present invention. Accordingly, the present invention is intended to embrace all such alternatives, modifications and variances that fall within the scope of the appended claims.

What is claimed is:

1. A phase transfer process for conducting heterogeneous reactions in a liquid-liquid two phase reaction system comprising a water-miscible polar liquid phase and a non-polar liquid phase which is at least partially miscible with the polar liquid;

said reaction being carried out between reactants selectively soluble in the different phases, one of the reactants being transferred into the other phase by means of a phase transfer catalyst which is soluble in said polar liquid phase with said one reactant;

said phases being separated after completion of the reactions by adding water to the two phase reaction system to dissolve out the polar liquid phase containing the phase transfer catalyst into an aqueous phase which is immiscible with the non-polar liquid phase;

separating the phase transfer catalyst from the polar liquid phase by passing the aqueous polar liquid phase through a membrane which retains the transfer catalyst while passing the polar liquid;

and re-using the recovered phase transfer catalyst in another phase transfer process.

2. A pulse transfer process according to claim 1 further comprising a soluable electrophilic polymer.

3. A phase transfer process according to claim 1 in which said reactants comprise a saturated hydrocarbon/p-methyl styrene copolymer having a plurality of pendant electrophilic sites, which is soluble in the non-polar liquid phase, and at least one nucleophilic reagent which is capable of nucleophilic substitution displacement reaction with said electrophilic sites to convert said sites to ester or ether sites, said nucleophilic reagent being soluble in said polar liquid.

4. A phase transfer process according to claim 1 wherein the phase transfer catalyst is a Group 15 salt compound.

5. A phase transfer process according to claim 4 wherein the salt compound is a quaternary ammonium salt compound.

6. A phase transfer process according to claim 1 in which said polar liquid is selected from the group consisting of aliphatic alcohols having up to about six carbon atoms, aliphatic ketones, and aliphatic ethers.

7. A phase transfer process according to claim 1 in which said polar liquid is isopropanol, diethyl ketone, or methyl ether.

8. A phase transfer process according to claim 1 in which said non-polar liquid is selected from the group consisting of cycloaliphatic hydrocarbons, hydrocarbons having from 4 to 7 carbon atoms, and halogenated hydrocarbons having 1 to 7 carbon atoms.

9. A phase transfer process according to claim 1 wherein said non-polar liquid is cyclohexane, pentane, or ethylene chloride.

10. A phase transfer process according to claim 1 wherein said membrane allows one way passage of an aqueous phase.

11. A phase transfer process according to claim 1 wherein said membrane is a polyamide membrane.

* * * * *